(12) United States Patent
Thompson et al.

(10) Patent No.: US 7,573,780 B2
(45) Date of Patent: Aug. 11, 2009

(54) ELECTRODE CONFIGURATIONS FOR SUPPRESSION OF ELECTROSEISMIC SOURCE NOISE

(75) Inventors: Arthur H. Thompson, Houston, TX (US); Scott C. Hornbostel, Houston, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 65 days.

(21) Appl. No.: 10/583,459

(22) PCT Filed: Dec. 9, 2004

(86) PCT No.: PCT/US2004/041451

§ 371 (c)(1),
(2), (4) Date: Jun. 19, 2006

(87) PCT Pub. No.: WO2005/093460

PCT Pub. Date: Oct. 6, 2005

(65) Prior Publication Data

US 2007/0115754 A1 May 24, 2007

Related U.S. Application Data

(60) Provisional application No. 60/547,998, filed on Feb. 26, 2004.

(51) Int. Cl.
*G01V 11/00* (2006.01)
*G01V 3/02* (2006.01)
*G01V 1/00* (2006.01)

(52) U.S. Cl. ............................. 367/14; 324/359; 702/17

(58) Field of Classification Search .................. 367/58, 367/14; 324/347, 354, 357–359, 370–371, 324/373–374

See application file for complete search history.

(56) References Cited

U.S. PATENT DOCUMENTS 1,841,376 A * 1/1932 Nichols et al. .............. 324/357

(Continued)

FOREIGN PATENT DOCUMENTS

WO WO 02/091020 11/2002

OTHER PUBLICATIONS

Montahaei et al. Electroseismic wave simulation generated from a seismic pulse in a two-layer mediu. Journal of the Earth & Space Physics. vol. 31. No. 2. 2005. p. 18. Abstract Only.*

(Continued)

*Primary Examiner*—Eric Bolda
*Assistant Examiner*—Ari M Diacou
(74) *Attorney, Agent, or Firm*—ExxonMobil Upstream Research Co. Law Dept.

(57) ABSTRACT

Method for survey design including configuring electrodes to reduce near-surface noise in the seismic response from an electroseismic survey of a subterranean formation. Different embodiments of the invention include (1) selective measurement of the surface noise to remove it from the data; (2) suppressing surface noise generation by reducing electric fields in the vicinity of some of the electrodes; (3) creating source signature differences between the near-surface seismic response and the deep response enabling the near surface response to be removed in data processing; (4) applying an external near-surface magnetic field to modulate the near-surface seismic response, enabling it to be removed in processing; and (5) constructing a partial Faraday cage to shield a near-surface region from fields generated by the electrodes.

26 Claims, 5 Drawing Sheets

U.S. PATENT DOCUMENTS

| | | | | |
|---|---|---|---|---|
| 1,842,361 A * | 1/1932 | Nichols et al. | | 324/357 |
| 1,842,362 A * | 1/1932 | Nichols et al. | | 324/357 |
| 1,926,212 A * | 9/1933 | Nichols et al. | | 324/357 |
| 2,054,067 A * | 9/1936 | Blau et al. | | 367/14 |
| 2,150,517 A * | 3/1939 | Muzzey, Jr. | | 324/357 |
| 2,156,259 A * | 5/1939 | Blau | | 367/14 |
| 2,172,271 A * | 9/1939 | Athy et al. | | 324/357 |
| 2,172,778 A * | 9/1939 | Taylor, Jr. | | 324/354 |
| 2,613,247 A * | 10/1952 | Lee | | 324/370 |
| 2,750,557 A * | 6/1956 | Bricaud | | 324/347 |
| 2,885,633 A * | 5/1959 | Cook | | 324/357 |
| 3,096,477 A * | 7/1963 | Smith et al. | | 324/373 |
| 3,181,057 A * | 4/1965 | Bravenec | | 324/373 |
| 3,659,192 A * | 4/1972 | Ryss et al. | | 324/357 |
| 3,798,535 A * | 3/1974 | Schuster | | 324/373 |
| 3,975,674 A * | 8/1976 | McEuen | | 324/357 |
| 4,151,458 A * | 4/1979 | Seager | | 324/357 |
| 4,251,773 A * | 2/1981 | Cailliau et al. | | 324/347 |
| 4,339,720 A | 7/1982 | Halverson | | 324/362 |
| 4,463,825 A * | 8/1984 | Lerwill | | 181/113 |
| 4,786,874 A * | 11/1988 | Grosso et al. | | 340/853.4 |
| 4,812,766 A | 3/1989 | Klein | | 324/362 |
| 4,904,942 A * | 2/1990 | Thompson | | 324/323 |
| 5,191,290 A * | 3/1993 | Gianzero et al. | | 324/374 |
| 5,486,764 A * | 1/1996 | Thompson et al. | | 324/323 |
| H001524 H * | 4/1996 | Thompson et al. | | 324/334 |
| H001561 H * | 7/1996 | Thompson | | 367/188 |
| 5,841,280 A * | 11/1998 | Yu et al. | | 324/323 |
| 5,877,995 A | 3/1999 | Thompson et al. | | 367/14 |
| 6,060,886 A * | 5/2000 | Tabarovsky et al. | | 324/373 |
| 6,308,135 B1 * | 10/2001 | Hocking | | 702/2 |
| 6,373,254 B1 * | 4/2002 | Dion et al. | | 324/369 |
| 6,462,549 B1 * | 10/2002 | Curtis et al. | | 324/323 |
| 6,476,608 B1 | 11/2002 | Dong | | 324/323 |
| 6,477,113 B2 | 11/2002 | Hornbostel et al. | | 367/38 |
| 6,664,788 B2 * | 12/2003 | Hornbostel et al. | | 324/323 |
| 6,842,697 B1 * | 1/2005 | Millar et al. | | 702/2 |
| 6,885,945 B2 * | 4/2005 | Fujinawa et al. | | 702/15 |
| 6,896,074 B2 * | 5/2005 | Cook et al. | | 175/50 |
| 7,034,539 B2 * | 4/2006 | Ueda et al. | | 324/357 |
| 7,042,801 B1 * | 5/2006 | Berg | | 367/14 |
| 7,227,362 B2 * | 6/2007 | Warren et al. | | 324/334 |
| 7,242,194 B2 * | 7/2007 | Hayman et al. | | 324/374 |
| 2001/0046185 A1 * | 11/2001 | Hornbostel et al. | | 367/38 |
| 2001/0048638 A1 * | 12/2001 | Evans et al. | | 367/86 |
| 2002/0181326 A1 * | 12/2002 | Hornbostel et al. | | 367/14 |
| 2004/0051531 A1 * | 3/2004 | Chemali et al. | | 324/367 |
| 2005/0134280 A1 * | 6/2005 | Bittar et al. | | 324/367 |
| 2005/0194182 A1 * | 9/2005 | Rodney et al. | | 175/24 |
| 2007/0115754 A1 * | 5/2007 | Thompson et al. | | 367/15 |
| 2007/0177705 A1 * | 8/2007 | Lu et al. | | 375/377 |
| 2007/0285274 A1 * | 12/2007 | Esmersoy | | 340/853.5 |
| 2007/0294036 A1 * | 12/2007 | Strack et al. | | 702/14 |

OTHER PUBLICATIONS

Satamarina et al. A Survey of Elastic and Electromagnetic Properties of Near-Surface Soils. http://www.uwgeotech.org/pdf/sanasu.pdf.*

Garambois et al. Seismoelectric wave conversions in porous media: Field measurements and transfer function analysis. Geophysics. vol. 66. No. 5. 2001. pp. 1417-1430.*

Mikhailov, O.V. et al. (1997) "Electroseismic Investigation of the Shallow Subsurface: Field Measurements and Numerical Modeling", *Geophysics*, 62, No. 1, pp. 97-105.

Mogilatov, V. and Balashov, B., (1996) "A New Method of Geoelectrical Prospecting by Vertical Electric Current Soundings", *J. Appl. Geophysics*. 36, pp. 31-41.

* cited by examiner

ELECTRODE CONFIGURATIONS FOR SUPPRESSION OF ELECTROSEISMIC SOURCE NOISE

This application is the National Stage of International Application No. PCT/US2004/041451, filed Dec. 9, 2004, which claims the benefit of U.S. Provisional Patent Application No. 60/547,998, filed Feb. 26, 2004.

FIELD OF THE INVENTION

This invention relates generally to the field of geophysical prospecting and, more particularly, to electroseismic prospecting, including reservoir delineation. Specifically, the invention is improved electrode configurations for electroseismic prospecting for hydrocarbons.

BACKGROUND OF THE INVENTION

The electroseismic (ES) method is an exploration tool designed to image conversions between electromagnetic and seismic energy. An electric current is created in the subsurface of the Earth by applying an electrical potential between two or more electrodes in contact with the Earth. These electrodes may be wires buried in trenches, pipes or rods placed in holes, casings of wells, either water wells or wells used in hydrocarbon exploration and production, or sheets of metal buried near the surface. The Earth current that is produced by these electrodes interacts with subterranean formations to create seismic waves. These seismic waves have particularly large amplitudes when they are created at the boundaries between rock containing hydrocarbon and non-reservoir rock.

To be effective, this method must distinguish seismic signals that originate at or near the Earth's surface from those generated at greater depth, particularly, signals originating at hydrocarbon reservoirs or other deep targets of interest. The present inventors have discovered numerous sources of unwanted seismic noises that can be generated near the surface electrodes, including:

- ES conversions at a shallow water table or at other inhomogeneities in near-surface rock or soil;
- Electric field excitation of buried pipes, fences, or other infrastructure;
- ES conversions that occur at the boundary between the electrode and the soil; and
- Seismic waves generated by forces between neighboring electrical conductors carrying electrical current.

That these noise sources can be quite significant in magnitude is not obvious, but it has been discovered to be the case by the present inventors in the course of their experimentation with electroseismic prospecting. Such field experiments led to the realization that electroseismic signals originating near the electrodes can be larger than signals from greater depth because the electric field strength is typically large near the electrodes. It is thus desirable to develop methods of data collection that will distinguish between signals generated at depth and those generated at the surface, or will reduce the amplitude of surface noise, or will provide other means for minimizing the effects of surface noise.

There is no current technology for suppression of near-surface noise in ES methods because the ES method is still relatively new and unutilized, dating back to the 1999 U.S. Pat. No. 5,877,995 to Thompson and Gist. Drawings in the Thompson and Gist patent and in U.S. Pat. No. 6,477,113 to Hornbostel and Thompson and WPO International Publication No. WO 02/091020 by Hornbostel, et al., show one set of two electrodes, and test data shown in those publications were obtained with this basic configuration. This existing technology permits neither the separation of shallow and deep signals nor mitigation of surface noise interference. The present invention satisfies this need.

SUMMARY OF THE INVENTION

In one embodiment, the invention is a method for survey design including configuring, and selecting the number of, a plurality of near-surface electrodes connected to the outputs of a source signal generator for transmission of electrical current into the earth in an electroseismic survey of a subsurface formation so as to cause current to penetrate to the depth of interest and produce a seismic response at deployed receivers while providing for substantially reduced noise from near-surface conversions of electromagnetic to seismic energy, said method comprising selecting a technique from the following group:

(a) designing a shallow survey to generate only near-surface electroseismic response of the deep survey, thereby generating a surface noise correction for subtracting, after amplitude normalization, from the seismic response of the deep survey;

(b) positioning at least two electrodes of the same polarity to substantially minimize near-surface electric fields in the vicinity of these electrodes, thereby providing an area of low surface noise;

(c) designing the source transmission and electrode configuration such that the near-surface noise can be distinguished from the deep response in subsequent data processing based on source signature differences;

(d) using an applied magnetic field to modulate the near-surface noise so that it can be distinguished from the deep response in subsequent data processing;

(e) positioning one or more electrically conducting components, said components being unconnected to the signal generator, so as to shield a near-surface region from electric fields generated by the electrodes.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The present invention is electrode configurations for suppression of near-surface noise in electroseismic prospecting. Alternative embodiments of the invention approach this problem in somewhat different ways. The following description places various embodiments or techniques of the present invention into one or another of four categories characterized by their shared similarities.

1. Selective Measurement of Surface Noise and Removing Noise from Data

Figure 1:
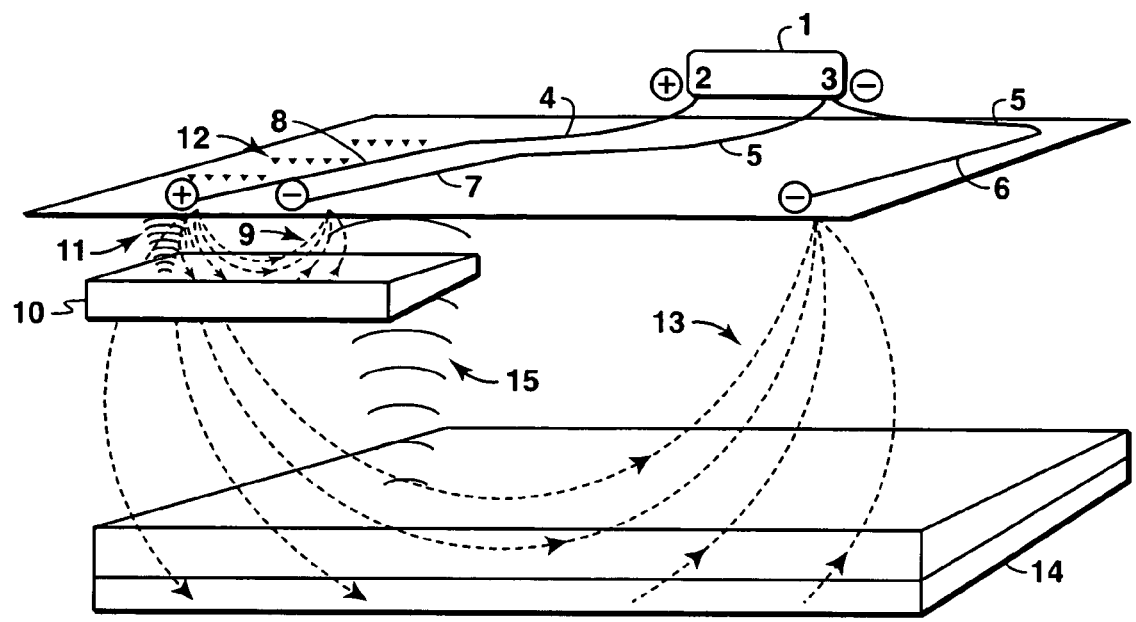
FIG. 1 illustrates a field layout for acquisition of electroseismic data with three electrodes, and further illustrates how the near-surface electroseismic response may be separately measured.

FIG. 1 illustrates an embodiment of the present invention in which three electrodes, one with positive polarity and two negative, are used for identification of surface noise and its removal. The source of power 1, which may be called a source signal generator, has a positive output, 2, and a negative output 3. These outputs are connected to wires 4 and 5 that are further connected to electrodes 6, 7, and 8. (The signal generator and its connections are not shown in many of the succeeding drawings, which show the electrode arrangements only.) The electrodes are illustrated in FIG. 1 to represent horizontal wires buried in trenches in the ground. These electrodes may also be made of rods or tubes or pipes, and they may be placed in vertical holes in the ground. A person skilled in the art will recognize many possible variations in the way that contact is made with the ground, all of which are intended to be part of the present invention. Although both electrodes 6 and 7 are shown connected to the power source 1 in FIG. 1, in the method disclosed below, only one of these electrodes is connected at a given time, during which the other is disconnected.

Some fundamental concepts of the present invention will be described by comparing signals generated at subsurface structures 10 and 14. The positive electrode 8 and the negative electrode 7 create electrical currents 9 in the earth. The currents 9 will have their largest values at depths equal to or less than the separation between electrodes 7 and 8. If these two electrodes are spaced 100 feet apart, then the current density 9 will decay rapidly at depths greater than 100 feet. The subsurface formation 10 is illustrated to be at a depth less than the distance between electrodes 7 and 8. When the electric current penetrates layer 10, a seismic wave 11 is generated by electroseismic coupling as disclosed by Thompson and Gist in their 1999 patent. This seismic wave is detected by seismic receivers called geophones 12. Current 13 will also flow from the positive electrode 8 to the other negative electrode 6. Because of the greater electrode separation, this current flow will penetrate to greater depths where it penetrates a deeper formation 14, giving rise to seismic wave 15, which is also detected by geophones 12. The current flow 13 also causes conversion to seismic energy in the shallow formation 10.

Thus, collecting ES data using electrodes 8 and 7 produces substantial responses only from shallow structures, while electrodes 8 and 6 produce ES signals from both shallow and deep structures. Accordingly, in this embodiment of the present invention, the signal from deep formation 14, which is the depth of interest, is extracted from the data from electrodes 8 and 6 (with electrode 7 disconnected from the power supply) by subtracting the signals measured using electrodes 8 and 7 (with electrode 6 disconnected). This subtraction requires matching the amplitudes (i.e., normalization) of signals measured from 8 and 7 to the shallow features in the data from electrodes 8 and 6.

2. Suppressing Surface Noise Generation: Optimizing Surface Electric Fields

Some embodiments of the present invention operate on the principle of reducing surface noise instead of the subtraction-correction technique disclosed above. In these embodiments, the electrodes are used to reduce the amplitude of surface electric fields, thereby reducing the magnitude of near-surface seismic conversions. An arrangement of "near" electrodes of the same polarity is designed to minimize the electric field in the vicinity of the near electrodes, which is therefore a preferable location for the receiver geophones, while maintaining a strong field at depth. Thus, the seismic signals generated near the surface, which are not of interest, are suppressed, instead of intentionally generating noise signals for later subtraction as in the embodiment illustrated by FIG. 1. One or more electrodes of opposite polarity are located a sufficient distance from the near electrodes to penetrate the deep formations of interest. (The electrode polarity assignments may be reversed in any of these embodiments.) The detailed and refined design of the electrodes is determined by maximizing the electric fields at depth relative to the electric fields near the electrodes. Examples of such embodiments follow.

Figure 2:
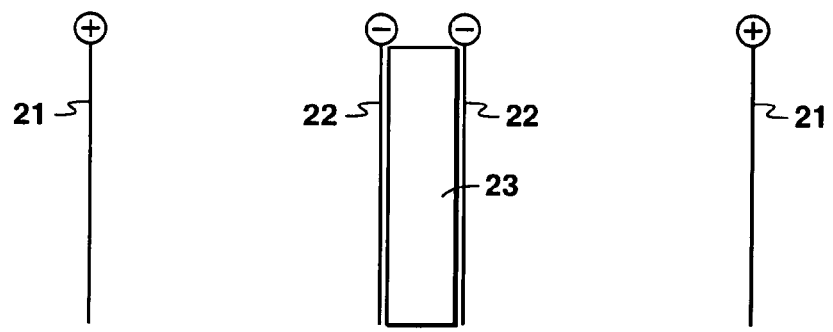
FIGS. 2, 3 and 5 are examples of near and far electrode configurations that create a region of low near-surface electric field around the near electrodes while maintaining strong fields at depth, FIG. 2 using four parallel, horizontal electrodes, FIG. 3 being a variation on the arrangement of FIG. 2 where the two near electrodes are replaced by vertical electrodes, and FIG. 5 employing several near electrodes arrayed in a closed polygon configuration.

In FIG. 2, negative electrodes 22 are placed to create a region of minimal electric field in the region 23 between them. This arrangement will minimize the excitation of electric-field-generated noise in 23. The electrodes 22 are horizontal buried wires or other conductors. Two positive electrodes 21 are used in this embodiment. All four electrodes may be substantially parallel, coplanar, and buried at shallow depths, or they may be varied in depth and orientation to minimize the electric field in the neighborhood of the near electrodes. When the electrodes are arranged in this manner, the geophones located in region 23 receive seismic energy converted in deep formations, but minimal shallow excitations. Wherever the geophones are located, they will receive minimal surface excitations from the low-field zone created by the near electrodes' configuration.

Figure 3:
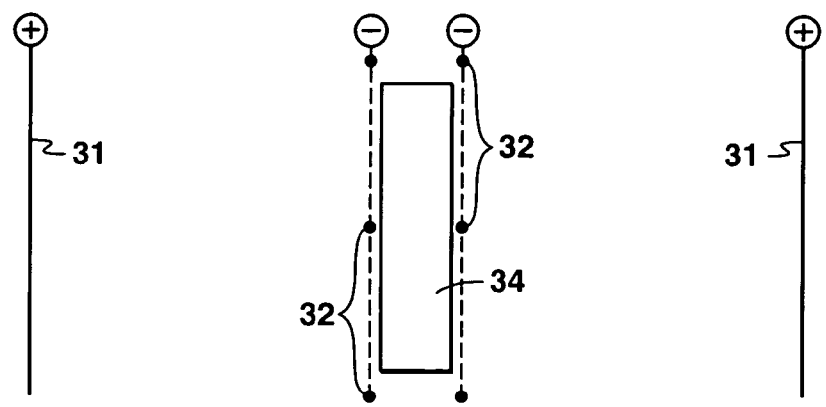

FIG. 3 illustrates a variation on the configuration of FIG. 2. In this embodiment, the near electrodes are pipes or rods 32 placed vertically in the earth. The distant electrodes 31 of opposite polarity may be buried wire, or any combination of stakes, pipes, wells or sheets of electrode materials. When the pipes or rods constituting the near electrodes penetrate the earth to a depth equal to or greater than the horizontal dimensions of region 34, the electric field can be minimized throughout the volume of region 34.

Figure 5:
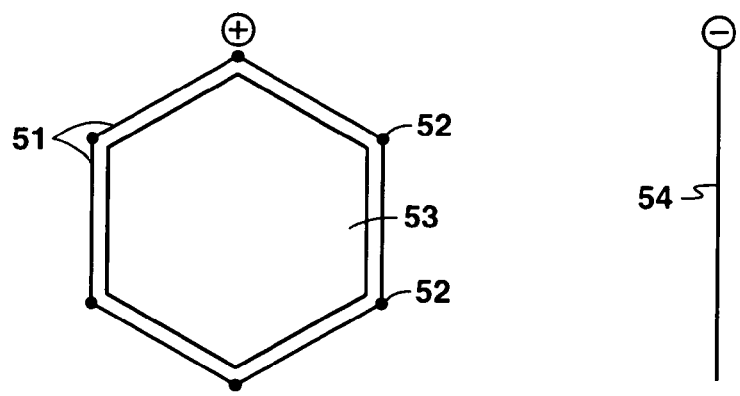

FIG. 5 illustrates another embodiment that minimizes electric fields in the vicinity of the near electrodes. In this embodiment, a buried wire 51 is laid out in the form of a closed curve or polygon, or, alternatively, vertical rods or pipes 52 may be placed in the ground to define a closed volume of earth where the electric field will be minimized relative to the electric field at depth. 51 or 52 are the near electrodes as explained above, and the opposite polarity is represented in this embodiment by the single electrode 54. Region 53 will be a region of minimum electric field where the geophones are preferably placed.

In embodiments such as those discussed above in which an arrangement of near electrodes all connected to the same terminal of the signal generator is used to create a region of small near-surface electric field, it may be optimal to apply slightly different potentials to one or more near electrodes rather than to maintain them at exactly the same potential. This can be accomplished with a single signal generator using potentiometers, dropping resistors or similar devices in the connections. The near-surface electric fields can be measured experimentally, and those measurements used to empirically adjust the potentials of the near electrodes to further reduce the fields.

Figure 8:
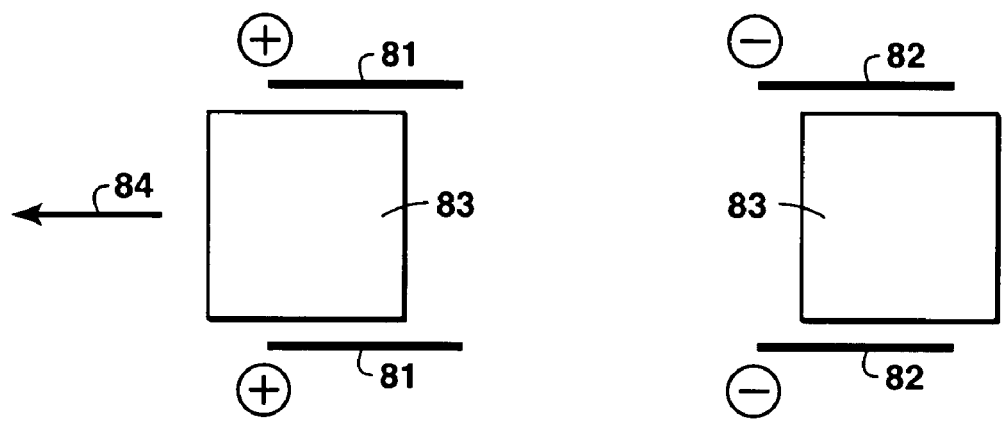
FIG. 8 illustrates a method for collecting electroseismic data along a path while minimizing electric fields near the electrodes.

FIG. 8 illustrates a method for collecting electroseismic data along a path, or swath, to cover a large area of land, to image a large volume of the subsurface, and, at the same time, to minimize the electric fields near the electrodes. The two positive electrodes 81 and the two negative electrodes 82 create regions of approximately uniform electric potential between them in areas 83. Seismic receivers (not shown) advantageously may be placed in areas 83 where there will be small electric fields and hence, small electrical interference with the receivers.

When the distance between the electrodes 81 is small compared to the reservoir depth, the region of small electric field 83 is localized to the near surface and to regions around the electrodes. These small-field regions will minimize the generation of near-surface noises. When the distance between electrodes 81 and 82 is approximately equal to the target depth, this system of electrodes will create appreciable electric fields at the target.

Those skilled in the art will recognize that the structure of FIG. 8 can be systematically moved in the direction 84 to achieve coverage over large areas of land.

Figure 10:
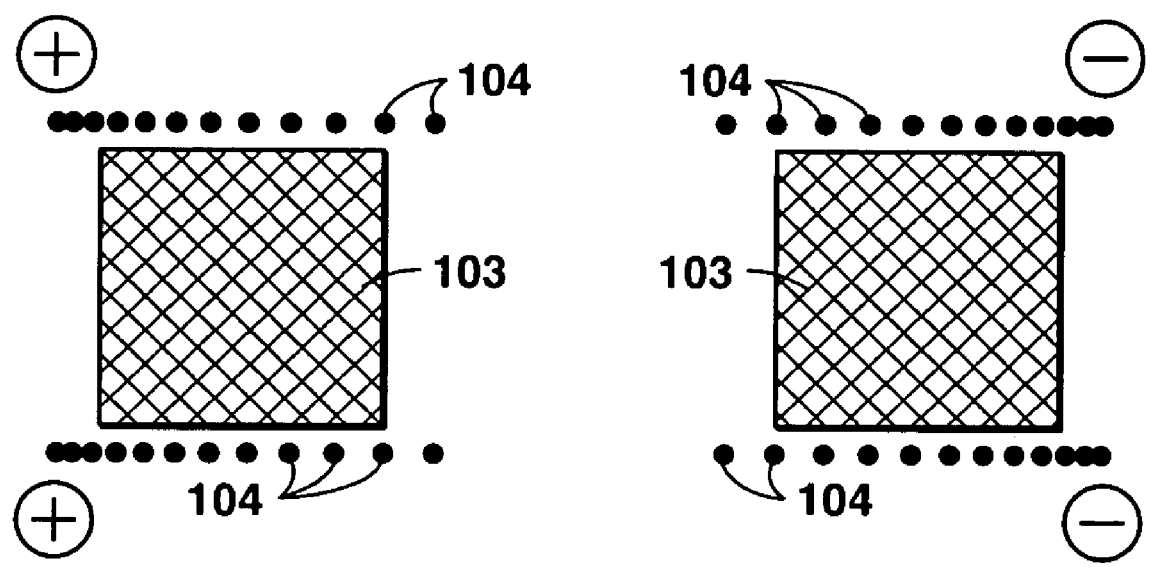
FIG. 10 illustrates how electrodes composed of stakes, pipes or rods placed in the ground can be used to produce an arrangement that simulates that of FIG. 8 and further reduces near-surface electric fields.

FIG. 10 illustrates how electrodes composed of stakes, pipes, or rods placed in the ground, can be used to further reduce near-surface electric fields and electroseismic noise. The overall arrangement is similar to that shown in FIG. 8 with positive electrodes 81, negative electrodes 82 and low electric field areas 83. But now the electrodes are constructed by placing vertical electrodes 104 in the ground. For example, electrodes 104 may be common pipe, metal rods, or cable anchors used for power poles. These electrode structures may penetrate, typically, 1 to 30 feet into the ground, the depth being controlled by the needed electrical resistance of each electrode.

The electric fields in areas 103 will be largest where the positive and negative electrodes are closest together. This tendency for the field to be largest in that close region can be partially corrected by placing the buried pipe/rod electrodes with the variable spacing such as is illustrated. The spacing of electrode rods is made closer together in regions where the electric field is small. This arrangement forces more current to enter the ground where the electrode rods are close together and hence to raise the electrical potential in those regions. The systematic placing of the electrode rods can be used to minimize the electric field in regions 103 and hence reduce the electroseismic noise in those regions.

Figure 6:
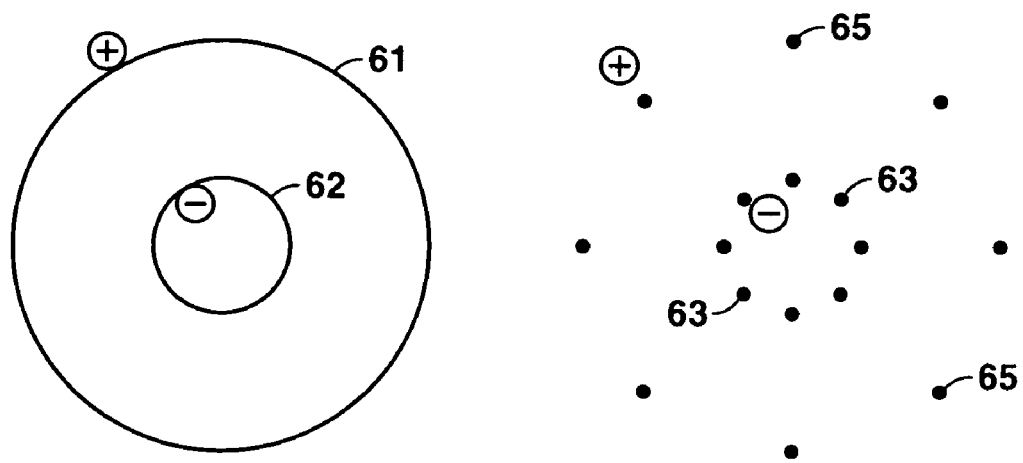
FIG. 6 illustrates electrode arrangements designed to minimize the near surface magnetic field.

The current flow between the electrodes in electroseismic prospecting also generates magnetic fields. Such magnetic fields can also produce near-surface seismic conversion effects that appear as noise in the measured seismic response. Techniques of the present invention can also be applied to deal with this type of noise. FIG. 6 illustrates two ways to create a minimal magnetic field at the surface and to establish a maximum vertical field at depth. This electrode geometry has been discussed in the context of electromagnetic surveying for hydrocarbons or minerals by Mogilatov and Balashov in *J. Appl. Geophys.* 36, 31-41 (1996). In electromagnetic surveying, an electromagnetic signal is transmitted into the subsurface, and receivers are placed to detect the resulting electromagnetic fields at selected locations. Electroseismic conversion is not considered, nor consequently is minimization of seismic noise. The authors disclose that the symmetry of this electrode system minimizes the magnetic field produced by the currents in the electrode, or in the surface of the Earth. The positive electrode 61 and the negative electrode 62 create currents that travel radially outward in the Earth's surface. These currents create no vertical magnetic field because of self cancellation. Likewise, pairs of positive vertical electrodes 65 and negative vertical electrodes 63 will produce no vertical magnetic fields at the Earth's surface because of cancellation between adjoining pairs. In either arrangement, the near-surface electric fields in the center circular area will be minimal because of the principles employed in the electrode arrangements of FIGS. 2, 3 and 5. Seismic receivers placed there will pick up low near-surface seismic conversion of either electric or magnetic energy. Mogilatov and Balashov also point out that the electric field in the subsurface is vertical below the center point of the electrode system. Thus, the geometry of FIG. 6 is good for producing electroseismic conversion at a horizontal interface in the subsurface with low surface noise, although this was not considered or disclosed by Mogilatov and Balashov.

Figure 9:
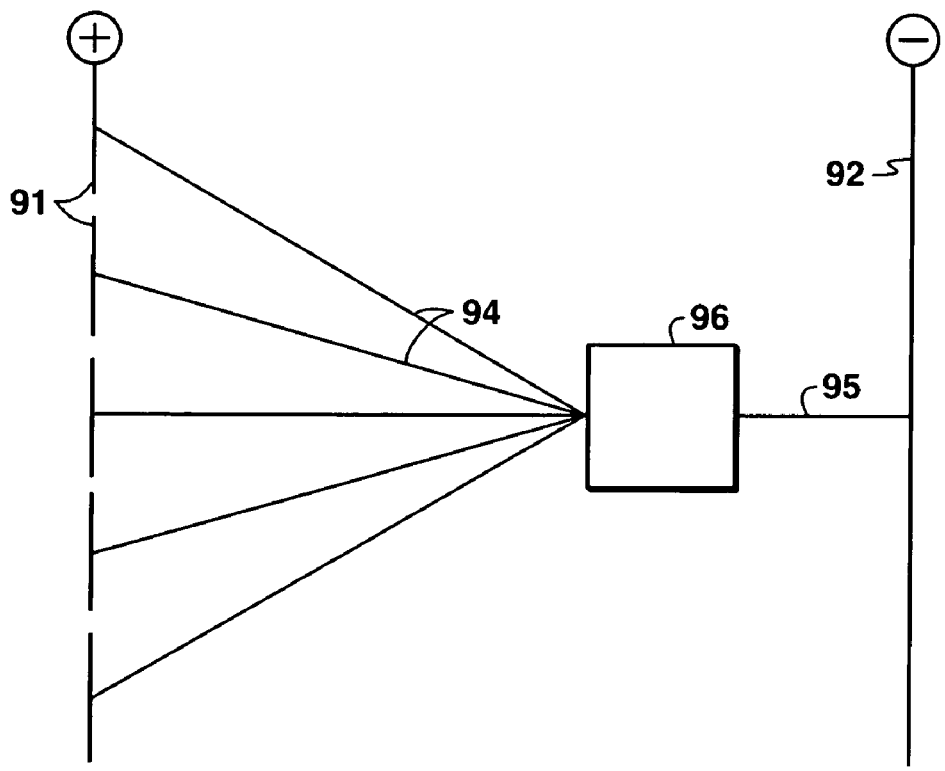
FIG. 9 illustrates reduction in near-surface electric and magnetic fields when many electrodes are used in parallel.

FIG. 9 illustrates reduction in near-surface electric and magnetic fields when many electrodes are used in parallel circuit connection. The positive electrode is divided into a number of segments 91 while the negative electrode 92 is a single electrode. The current supplied by time-varying power source 96 passes through single wire 95 and into electrode 92. The same current is split into smaller currents by the multiple connecting wires 94 and the electrode sections 91. Currents flowing in an electrical conductor create associated magnetic fields that circulate around the conductor. The amplitude of the magnetic field is proportional to the current flowing in the wire. The magnetic field around wire 95 and electrode 92 is then larger than the magnetic fields around wires 94 and electrode segments 91. Thus, the magnetic field is reduced in the vicinity of the positive electrode compared to the vicinity of the negative electrode because of (a) less current through each electrode segment 91 than through electrode 92, and (b) cancellation of vertical magnetic field components between wires 94. In another embodiment, electrode 92 is split the same as electrode 91, creating reduced fields on both sides of the configuration.

It is well known that time varying magnetic fields interact with conductors to create forces on those conductors. Such forces will be larger in the vicinity of 92 and 95 than they are in the vicinity of 91 and 94. These forces can create disturbances in pipes, fences, wells and other structures in a typical oil-field environment. These disturbances are a source of electroseismic noise. FIG. 9 therefore illustrates another embodiment of the present invention whereby source electroseismic noise is reduced by decreasing the attractive and repulsive forces between near electrodes by the particular electrode arrangement used. The effect is achieved by partitioning of the total current into smaller currents that are distributed over a larger area.

The geometry of FIG. 9 has an added value. The partitioned circuits in wires 91 and 94 have smaller electrical inductance than the wires 92 and 95. Electrical inductance is known to have a negative effect on power generation equipment and also limits the electrical power that can be delivered to the ground as disclosed in WPO International Publication No. WO 02/091020 by Hornbostel, et al.

In another embodiment of the present invention, near-surface fields are minimized by positioning conducting material at a selected near-surface location so as to partially shield that region from the subterranean electric fields generated by the electrodes. Such conducting component or components are electrically connected to each other but not to the electrode circuit. As such, the conducting shield will assume a constant floating potential and will act as a partial Faraday cage thus reducing electric fields in the shielded, near-surface region. The shielding components may be any combination of wire, wire mesh, aluminum or other metallic foil, metal wells, metal sheets or rods.

3. Depressing Surface Noise with Electrode Arrays

Figure 4:
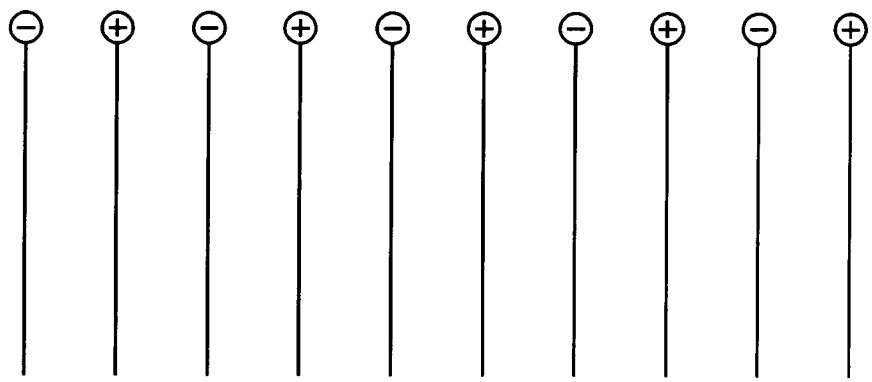
FIG. 4 illustrates an electrode configuration suitable for covering a large area.

FIG. 4 illustrates an embodiment in which many electrodes are placed a distance apart that is small compared to the depth of the target of interest (not shown). Negative electrodes and positive electrodes alternate along the survey direction. Thus, current paths exist between each positive electrode and each negative electrode. These many different current paths each interact with near surface pipes, fences, and the like in different ways, i.e., each will produce a somewhat different seismic source signature. On the other hand, each positive-negative electrode pair will excite deeper regions in essentially identical fashion because the difference in electrode locations is insignificant compared to the depth of targets of interest. Thus, a deep response from any electrode pair (spaced far enough apart to produce a deep response) will have substantially the same source signature as a deep response from any other electrode pair. In contrast, the combined shallow responses will be a mix of many different source signatures, and that mix itself will be a source signature distinguishable from that of the deep response. A person of ordinary skill in seismic data processing will be able to use these different source signatures to reject the near surface signals, leaving the deep signals. In a variation of this embodiment, switches can be used to alternately excite different combinations of positive and negative electrodes. The signature of the deep response will be unaffected by the switching, and thus the data processor is able to eliminate or reduce the near surface response by rejecting the varying components in the seismic signal. The array of FIG. 4 may also be used to generate a source signature for the near-surface response characterized by spatial phase variation to optimize real time rejection of source generated noise.

In a related embodiment, the source signal can be swept (using switches in the electrical connections to the electrodes) among the electrodes, sequentially exciting different combinations of pairs of electrodes. Any pre-selected sweep can be used. The desirable deep response will be unaffected by the sweep. The part of the measured response that is synchronized with the sweep will be the surface noise, and can be rejected in real time or in a subsequent processing step.

In this third category of embodiments, shallow, noise signals are not separately measured and they are not suppressed by creating small electric fields at the surface. Instead, many source locations produce many different source-noise signatures, while all of the many electrodes produce similar signals from depth. Those skilled in the art will understand how to process, preferably in real time, the data from the many electrodes to selectively enhance the signals common to all electrodes and originating at depth, while rejecting those unique signals generated near the electrodes. The configuration of FIG. 4 is useful for covering large areas. Further, various combinations of the positive and negative electrodes can be excited to elicit a minimum electric field in a desired area or volume to produce a category 2 embodiment of the present invention.

4. Modulating Surface Noise with Magnetic Fields

Figure 7:
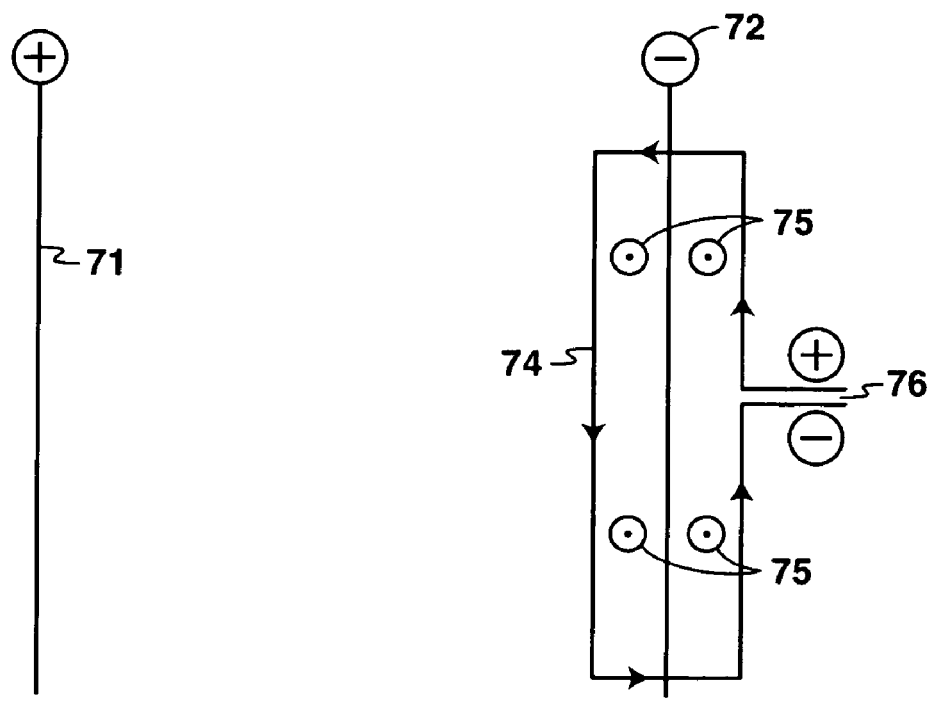
FIG. 7 illustrates a method for modulating subsurface electrical currents with an applied magnetic field.

FIG. 7 illustrates an embodiment of the present invention in which surface noises are identified and suppressed by modulating the surface currents with an applied magnetic field. In FIG. 7, electrodes 71 and 72 are used to apply a current to the subsurface. A separate power/signal generator 76 generates counter-clockwise current in wire loop 74 that has one dimension much smaller than the depth to the target. The current in loop 74 creates a magnetic field 75 out of the plane of the paper (and of the Earth's surface). The magnetic field also penetrates vertically into the subsurface before the field lines eventually curve and close in loops that enclose the current carrying wire 74. Such a magnetic field will constrain the subsurface current between electrodes 71 and 72 to move parallel to the magnetic field direction. This follows from the formula for force $\vec{F}$ exerted on a particle of charge q moving with velocity $\vec{v}$ through magnetic field $\vec{B}$:

$$\vec{F} = q(\vec{v} \times \vec{B})$$

From the definition of the vector cross product, the force is zero if the vectors $\vec{F}$ and $\vec{v}$ are parallel. Thus, the magnetic field from current loop 74 will cause the charge carrying particles moving from electrode 71 to electrode 72 to move in the direction of the magnetic field lines 75 as the charge carriers approach near the surface where electrode 72 is located. If the current were to stray in a direction perpendicular to the magnetic field, the interaction of the magnetic field with the moving charge would force the charge back to a direction parallel to the magnetic field. When the applied magnetic field is modulated in time (by modulating signal generator 76), the current in the subsurface is alternately constrained and then released by the applied field. But, because the loop has a dimension small compared to the depth of the target, the magnetic field will have a dominantly vertical direction only to a depth approximately equal to the smallest dimension of loop 74, and will thus modulate the current only near to the surface and the electrode. The magnitude and direction of the electric field at depths much greater than the dimensions of the loop are unaltered by the applied magnetic field. Thus, the application of a magnetic field preferentially alters the noise-producing, near-surface fields, and persons skilled in the art will realize that that permits their removal from the unchanging deeper signal by any of several known techniques. For example, if the magnetic field is modulated in time, then the noises created near the electrode will also be modulated in time. But the deeper signals from target structures will not be modulated significantly. The applied magnetic field thus distinguishes between source-generated noise and the signal from depth.

This embodiment differs from the first three categories discussed above. In this case, noise signals are not purposely created, local fields are not purposely reduced in size, and arrays are not used to remove the noise in processing. Rather, in this case, an applied magnetic field is used to modulate the noise-producing fields. The third and fourth categories may be conceptually combined since both involve designing waves by which near-surface noise may be discriminated in later data processing. The three main approaches used by the present invention to deal with near-surface ES noise are therefore (1) measuring the near-surface noise so that it may be subtracted; (2) generating less near-surface noise by creating regions having low-near surface electric fields; and (3) using electric or magnetic fields to modify the near-surface noise so that it may be discriminated. All of these approaches may be embraced by the term "reducing the problem of near surface noise."

As described previously, there are numerous possible noise sources in an electroseismic survey. Pipes, fences or other infrastructure may generate noise. Near-surface water tables or changes in soil properties can generate noise. The wires and electrodes used in the ES measurement may interact with each other and generate noise. The present invention concerns ways to deal with all such noise sources en masse, however many may be present. It will be obvious to persons in the art that one might instead try to tailor a noise removal approach to each individual possible noise source. As an example, it might be possible to physically remove wire fences from the survey area. Such an approach is clearly impractical compared to the present inventive method. Yet, without the present invention, such approaches might be necessary in some locations to get interpretable results.

Regardless of which embodiments of the present inventive method are used to reduce near surface noise effects, successful applications of electroseismic surveying can be undermined by failure to devote enough attention to such things as the layout of insulated wires carrying current to electrodes and the manner in which electrical contact is made between the electrodes and the earth. Persons skilled in the art will develop expertise in these related aspects of electroseismic prospecting as they practice the overall technology.

In the preceding description, in some of the drawings, and in some of the claims, polarity is mentioned in terms of positive and negative. As will be apparent to the reader skilled in the art, assigning polarity is only for the purpose of indicating which electrodes are wired to one output terminal of the signal generator, and which are connected to the other terminal. Any signal generator is assumed to have a nominal positive terminal and a nominal negative terminal. Polarities can be reversed, and frequently are in the preferred source signals for electroseismic prospecting. Moreover, some embodiments of the present invention require (relatively small) potential differences between electrodes otherwise of common polarity. Thus, one "near" electrode may be slightly positive in potential compared to another near electrode in embodiments where such an adjustment is made to further reduce near-surface electric fields, but both near electrodes will be substantially negative (or positive) relative to the one or more "far" electrodes. The term "polarity" is used herein to distinguish between the near and far electrodes in this example, not to refer to the slight potential differences among the near electrodes. The two near electrodes in the example just given are both referred to herein as negative electrodes for polarity identification purposes. This should be understood. It should also be understood that when electrodes are described as being electrically connected to a common output terminal of the signal generator, that does not necessarily mean by conducting wire, i.e., a voltage adjusting device such as a dropping resistor may be in the connecting circuit for one or more of the electrodes.

The foregoing description is directed to particular embodiments of the present invention for the purpose of illustrating it. It will be apparent, however, to one skilled in the art, that many modifications and variations to the embodiments described herein are possible. For example, the drawings illustrate specific electrode arrangements for certain embodiments. Many other electrode arrangements can be used to measure or suppress the shallow ES conversions according to the approach of the particular embodiment. Similarly, the drawings tend to show preferred receiver placement, but the invention will work with other receiver locations in place of or in addition to those shown. Also, the present inventive method is broken down into three numerated categories of approach; however, approaches falling in different categories may be combined and used on the same survey in some instances. Further, the descriptions given are in the context of surface electroseismic surveying, where the electrodes are placed on or near the Earth's surface, i.e., "near-surface" placement; however, the same principles can be applied to electrodes used in well applications, or use of wells themselves as electrodes. All such modifications and variations are intended to be within the scope of the present invention, as defined in the appended claims.

We claim:

1. A method for reducing noise from near-surface conversions of electromagnetic to seismic energy in an electroseismic survey of a subsurface formation, said survey using a plurality of near-surface electrodes connected to the output terminals of a source signal generator for transmission of electrical current into the earth, said method comprising:

positioning one item of conducting material or a plurality of such items connected by electrical conductor to each other to substantially minimize near-surface electric fields in a region between or defined by the item or items of conducting material, wherein in the case of a single item of conducting material the item is configured to define a region, thereby providing an area of low surface noise for survey receiver placement; and placing at least one seismic receiver in said region.

2. The method of claim 1, wherein the subtraction/correction technique is selected, and further comprising:

(a) positioning a first and second electrodes a distance apart on or near the surface above the subsurface formation, said distance being close enough to substantially prevent current penetration to depths of interest in the subsurface formation;

(b) positioning a third electrode a distance from the first two electrodes greater than the distance between the first two electrodes, said greater distance being sufficient to cause current to penetrate depths of interest in the subsurface formation;

(c) positioning one or more seismic receivers on or near the surface near the first two electrodes;

(d) providing electrical signal having a waveform across the first two electrodes and measuring the seismic response with the receivers, thereby constituting said shallow survey; and (e) providing electrical signal having the same waveform across the third electrode and one of the first two electrodes, and measuring the seismic response with the receivers, thereby constituting said deep survey.

3. The method of claim 2, wherein all electrodes are substantially horizontal and parallel, the electrodes have polarities at any instant of time such that the negative electrode is to the same side of the positive electrode for each of the two providing electrical signal steps, and the receivers are located to the opposite side of the first two electrodes from the third electrode.

4. The method of claim 2, wherein the amplitude normalization is adjusting the amplitudes of the deep survey response and the shallow survey response to be the same for shallow features of the subsurface formation.

5. The method of claim 4, wherein all electrodes are substantially horizontal and parallel, the electrodes have polarities at any instant of time such that the negative electrode is to the same side of the positive electrode for each of the two providing electrical signal steps, and the receivers are located to the opposite side of the first two electrodes from the third electrode.

6. The method of claim 1, wherein the subtraction/correction technique is selected, and further comprising:
(a) obtaining a first set of electroseismic data previously generated by positioning a first and second electrodes a distance apart on or near the surface above the subsurface formation, said distance being close enough to substantially prevent current penetration to depths of interest in the subsurface formation, then providing electrical signal having a waveform across the two electrodes and measuring a near-electrode seismic response with the receivers;
(b) obtaining a second set of electroseismic data previously generated by positioning a third electrode a distance from the first two electrodes greater than the distance between the first two electrodes, said greater distance being sufficient to cause current to penetrate depths of interest in the subsurface formation, then providing electrical signal having the same waveform across the third electrode and one of the first two electrodes, and measuring a far-electrode seismic response with the receivers;
(c) adjusting the amplitudes of the two measured seismic responses to be the same for shallow features of the subsurface formation; and
(d) subtracting the response due to the nearer electrodes from the response due to the farther electrodes.

7. The method of claim 6, wherein all electrodes were substantially horizontal and parallel, the electrodes had polarities such that the negative electrode was to the same side of the positive electrode for both measurements, and the receivers were located to the opposite side of the first two electrodes from the third electrode.

8. The method of claim 1, wherein the one or a plurality of items of conducting material comprise two or more near electrodes connected by electrical conductor to a first output terminal of the source signal generator, and further comprising:
(a) positioning the two or more connected near electrodes on or near the surface above the formation;
(b) positioning at least one far electrode each connected by electrical conductor to a second output terminal and separated from all the near electrodes by a distance sufficient to cause current to penetrate a depth of interest in the subsurface formation;
(c) placing one or more seismic receivers in locations central to the near electrodes;
(d) applying an electrical signal between the near electrodes and the far electrodes; and
(e) measuring the seismic response with the one or more receivers.

9. The method of claim 8, wherein there are two near electrodes and two far electrodes placed on opposite sides of the near electrodes, and all electrodes are substantially horizontal and parallel.

10. The method of claim 8, wherein there are at least four near electrodes oriented substantially vertically in two substantially parallel rows, and two substantially horizontal far electrodes placed on opposite sides of the two rows of near electrodes and substantially parallel to said two rows, said vertical electrodes defining a rectangular surface area of dimensions less than or substantially equal to the vertical electrodes' depth of penetration into the subsurface.

11. The method of claim 8, wherein the two or more near electrodes define a closed curve or polygon, and there is a single far electrode oriented substantially horizontally.

12. The method of claim 11, wherein the near electrodes are oriented substantially horizontally.

13. The method of claim 11, wherein the near electrodes are oriented substantially vertically.

14. The method of claim 8, wherein the near electrode spacing is small compared to the subsurface formation's depth of interest and the distance between the at least one far electrode and the near electrodes is approximately equal to said depth of interest.

15. The method of claim 8, wherein there are two near electrodes and two far electrodes, said far electrodes being spaced apart substantially the same distance as the near electrodes are spaced apart.

16. The method of claim 15, wherein all electrodes are substantially horizontal and parallel, and wherein one near electrode and one far electrode are substantially co-linear, and the other near electrode and far electrode are substantially co-linear.

17. The method of claim 8, wherein there are at least four near electrodes and four far electrodes and all electrodes are substantially vertical and penetrating the surface above the subsurface formation and lie substantially symmetrically in two substantially parallel planes with substantially the same number of near electrodes and far electrodes in each plane and substantially the same total number of near and far electrodes.

18. The method of claim 8, further comprising adjusting the voltages on the near electrodes to further reduce electric fields in the vicinity of the near electrodes, maintaining all near electrodes at a polarity opposite to the far electrodes.

19. The method of claim 1, wherein the technique of modulating the near-surface noise with an applied magnetic field is selected, and further comprising:
(a) positioning two electrodes separated by a distance sufficient to cause current to penetrate the depth of interest;
(b) positioning a substantially horizontal wire loop, on or near the surface in the vicinity of one of the electrodes, said loop being connected to a second electrical signal generator and said loop having dimensions comparable to the depth of said near-surface noise sources; and
(c) modulating the signal applied to the wire loop to apply a magnetic field to the near surface area within the loop.

20. The method of claim 19, wherein the electrodes are positioned substantially horizontally and parallel to each other.

21. The method of claim 1, wherein the technique of designing the source transmission is selected, and further comprising positioning at least four electrodes substantially in a row, approximately half of the electrodes having positive polarity and the remainder having negative polarity.

22. The method of claim 21, wherein the electrodes are positioned substantially horizontally and parallel to each other at substantially equal spacing, alternating positive polarity electrodes with negative polarity electrodes along the row.

23. The method of claim 21, further comprising sequentially exciting varying combinations of positive and negative electrodes with a sweep, said sweep providing source signature differences for distinguishing the deep response in data processing.

24. The method of claim 21, further comprising exciting selected combinations of electrodes, said combinations being selected to elicit reduced electric field in the vicinity of the receivers.

25. The method of claim 1 wherein the one or a plurality of items of conducting material are not connected to any terminal of the source signal generator, and the conducting material is selected from the following group: (a) wire; (b) wire mesh; (c) metal foil; (d) well; (e) sheet metal; (f) metal rod.

26. The method of claim 8, wherein the number of near electrodes is one, and its shape defines a closed curve or polygon.

* * * * *